United States Patent [19]

Ichihara

[11] Patent Number: 4,669,008
[45] Date of Patent: May 26, 1987

[54] DISK SUPPORT DEVICE

[75] Inventor: Akira Ichihara, Kakuda, Japan

[73] Assignee: Alps Electric Co., Ltd., Japan

[21] Appl. No.: 690,464

[22] Filed: Jan. 10, 1985

[30] Foreign Application Priority Data

Jan. 9, 1984 [JP] Japan ............................. 59-1226[U]

[51] Int. Cl.$^4$ ..................... G11B 5/012; G11B 23/02
[52] U.S. Cl. .......................................... 360/97; 360/133
[58] Field of Search ................... 360/133, 135, 97, 99

[56] References Cited

U.S. PATENT DOCUMENTS 4,149,207  4/1979  Porter, Jr. et al. ................. 360/133
4,413,294 11/1983  Beijer ................................... 360/99

Primary Examiner—John H. Wolff
Attorney, Agent, or Firm—Guy W. Shoup

[57] ABSTRACT

A disk support device for supporting a disk having a central hub having a central support hole and a support hole includes a rotatable drive shaft, a turntable fixedly mounted on the rotatable drive shaft and having a hole for supporting the disk on one surface thereof with the rotatable drive shaft inserted in the central support hole in the disk, and a leaf spring having one end fixed to an opposite surface of the turntable and supporting a positioning pin remotely from the one end thereof, the positioning pin projecting under the resiliency of the leaf spring through the hole in the turntable for engagement in the support hole in the disk, the leaf spring having a locking finger held in engagement with the turntable.

2 Claims, 8 Drawing Figures

DISK SUPPORT DEVICE

BACKGROUND OF THE INVENTION

The present invention relates to a disk support device for supporting and driving a small-size disk such as a 3.5-inch magnetic disk, and more particularly to a disk support device capable of accurately positioning a disk at the time it is supported thereon.

One conventional type of disk support device is illustrated in FIGS. 1 and 2 of the accompanying drawings. The disk support device serves to drive a flexible magnetic disk which is 3.5 inches across.

The disk support device includes a rotatable drive shaft 1 which is rotated by a stepping motor (not shown), and a turntable 2 fixed to an upper end portion of the rotatable drive shaft 1. The rotatable drive shaft 1 has an upper end 1a projecting beyond an upper surface of the turntable 2. The turnable 2 has a hole 2a and an internally threaded hole 2b. A leaf spring 3 is mounted on a lower surface of the turntable 2 and has a central recess 3a defined therein and a support hole 3b defined in an end thereof. The leaf spring 3 has a positioning pin 4 fixed to an opposite end thereof. The rotatable drive shaft 1 is inserted in the recess 3a in the leaf spring 3. A fastening screw 5 is inserted through the support hole 3b threadedly into the internally threaded hole 2b to secure the corresponding end of the leaf spring 3 to the lower surface of the turntable 2. The positioning pin 4 projects upwardly out of the hole 2a beyond the upper surface of the turntable 2.

FIGS. 3 and 4 illustrate the manner in which a flexible magnetic disk 6 is mounted on the disk support device shown in FIGS. 1 and 2. Designated at 7 is a hub secured to a central portion of the magnetic disk 6. As shown in FIG. 3, the hub 7 has a central support hole 7a and another support hole 7b. When the magnetic disk 6 is mounted on the disk support device, the end 1a of the rotatable drive shaft 1 is inserted in the central support hole 7a and the positioning pin 4 is inserted in the other support hole 7b.

In operation, the turntable 2 is rotated clockwise in the direction of the arrow A by the rotatable drive shaft 1 to thereby rotate the hub 7 and the magnetic disk 6 in the direction of the arrow A. A magnetic head (not shown) is pressed against the magnetic disk 6 to record or reproduce information.

While the magnetic head is pressed against the magnetic disk 6, a resistance is imposed from the magnetic disk 6 on the magnetic head to bring an edge of the support hole 7b in the hub 7 into abutment against the positioning pin 4, which is then subjected to a force in the direction of the arrow B. Therefore, the positioning pin 4 tends to be tilted through an angle α, thus deforming the leaf spring 3 as shown in FIG. 4.

When this happens, the hub 7 is displaced off the properly mounted position on the turntable 2. In general, one-pulse index signals are recorded at given positions on the magnetic disk in magnetic disk recording apparatus. The positions where such index signals are recorded must be accurate in order to ensure compatibility among the magnetic disk recording apparatus. If the magnetic disk 6 is displaced off position with respect to the turntable 2 as described above, then index signals will be generated at different positions, and compatibility among the magnetic disk recording apparatus will be lost.

SUMMARY OF THE INVENTION

With the prior art shortcoming in view, it is an object of the present invention to provide a disk support device of a simple construction which is capable of positioning a magnetic disk accurately with respect to a turntable.

According to the present invention, there is provided a disk support device for supporting a disk having a central hub having a central support hole and a support hole includes a rotatable drive shaft, a turntable fixedly mounted on the rotatable drive shaft and having a hole for supporting the disk on one surface thereof with the rotatable drive shaft inserted in the central support hole in the disk, and a leaf spring having one end fixed to an opposite surface of the turntable and supporting a positioning pin remotely from the one end thereof, the positioning pin projecting under the resiliency of the leaf spring through the hole in the turntable for engagement in the support hole in the disk, the leaf spring having a locking finger held in engagement with the turntable. With this arrangement, the leaf spring is prevented from being excessively twisted, and any tilting of the positioning pin is reduced to a minimum.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 5:
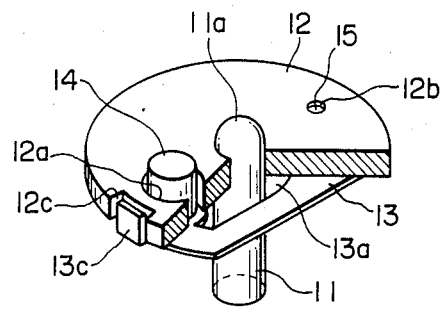
FIG. 5 is a perspective view, partly broken away, of a disk support device according to the present invention.
Figure 6:
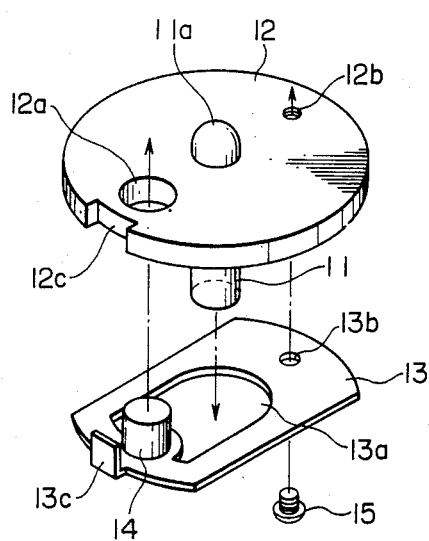
FIG. 6 is an exploded perspective view of the disk support device shown in FIG. 5.
Figure 8:
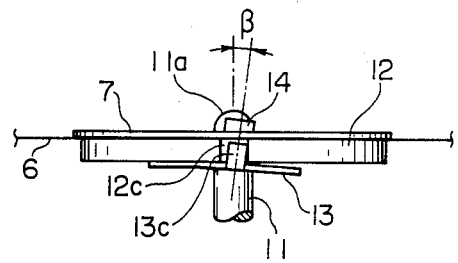
FIG. 8 is a front elevational view of the disk support device as illustrated in FIG. 7.

FIGS. 5 and 6 illustrate a disk support device according to the present invention.

The disk support device of the present invention includes a rotatable drive shaft 11 which is rotated by a stepping motor (not shown), and a turntable 12 fixed to an upper end portion of the rotatable drive shaft 11. The rotatable drive shaft 11 has an upper end 11a projecting beyond an upper surface of the turntable 12. The turntable 12 has a hole 12a and an internally threaded hole 12b, and also has a recess 12c defined in an outer peripheral surface thereof. A leaf spring 13 is mounted on a lower surface of the turntable 12 and has a central recess 13a defined therein and a support hole 13b defined in an end thereof. The leaf spring 13 has a locking finger 13c bent at a right angle from an opposite end thereof, and a positioning pin 14 fixed thereto inwardly of the locking finger 13c.

When the leaf spring 13 is mounted on the lower surface of the turntable 12, the rotatable drive shaft 11 is inserted in the recess 13a in the leaf spring 13. A fastening screw 15 is inserted through the support hole 13b threadedly into the internally threaded hole 12b to secure the leaf spring 13 to the lower surface of the turntable 12. The positioning pin 14 projects upwardly out of the hole 12a beyond the upper surface of the turntable 12. The locking finger 13c engages in the recess 12c.

To a flexible magnetic disk 6 to be mounted on the disk support device, there is centrally fixed a hub 7 (FIG. 7) having a central support hole 7a and another support hole 7b defined therein.

Operation of the disk support device thus constructed is as follows:

When the magnetic disk 6 is to be mounted on the disk support, the hub 7 is placed on the upper surface of the turntable 12. At this time, the distal end 11a of the rotatable drive shaft 11 projecting from the turntable 12 is inserted in the central support hole 7a. The positioning pin 14 is held against the lower surface of the hub 7 and has its distal end disposed back in the turntable 12 with the leaf spring 13 being flexed. As the turntable 12 starts rotating and the positioning pin 14 reaches the support hole 7b in the hub 7, the positioning pin 14 is inserted into the support hole 7b and projects upwardly beyond the upper surface of the hub 7 under the resilient force of the leaf spring 13. Thereafter, the positioning pin 14 drives the hub 7 to rotate the magnetic disk 6 in the direction of the arrow A in FIG. 7.

Figure 1:
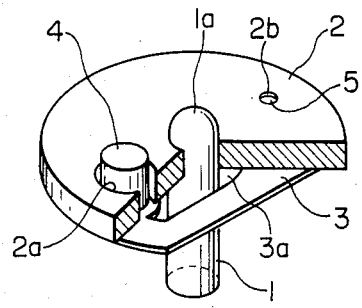
FIG. 1 is a perspective view, partly cut away, of a prior disk support device.
Figure 3:
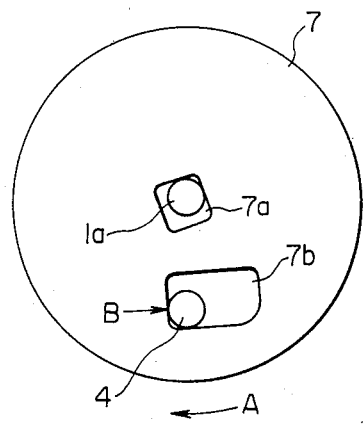
FIG. 3 is a plan view of the disk support device of FIG. 1 with a magnetic disk mounted thereon.
Figure 2:
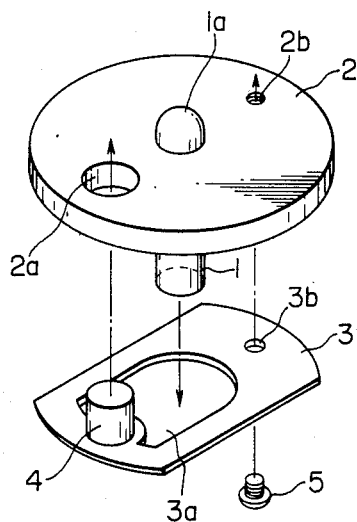
FIG. 2 is an exploded perspective view of the disk support device shown in FIG. 1.
Figure 4:
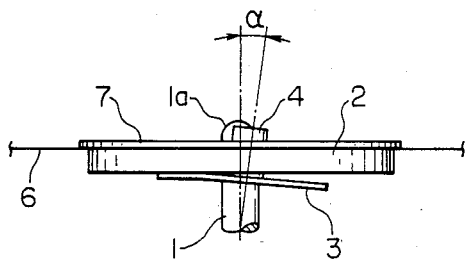
FIG. 4 is a front elevational view of the disk support device as shown in FIG. 3.
Figure 7:
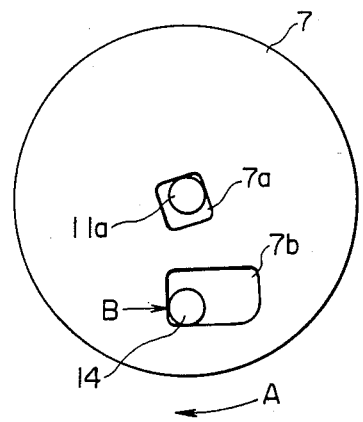
FIG. 7 is a plan view of the disk support device of FIG. 5 with a magnetic disk mounted thereon.

Since a magnetic head is pressed against the magnetic disk 6 during operation of the magnetic recording and reproducing apparatus, as described above, the magnetic disk 6 is subjected to a resistance to rotation thereof, and hence the hub 7 imposes a force in the direction of the arrow B in FIG. 7 on the positioning pin 14. Therefore, the leaf spring 13 tends to be twisted, but is twisted only to a small extent since the locking finger 13c of the leaf spring 13 is held in the recess 12c in the turntable 12. As a consequence, the positioning pin 14 is tilted by the force applied in the direction B through an angle $\beta$ which is much smaller than the angle $\alpha$ shown in FIG. 4. The angle $\beta$ is determined solely by the width of the recess 12c and the width of the locking finger 13c. Therefore, by keeping the angle $\beta$ in a range corresponding to an allowable error of the positional accuracy of the index signals recorded on the magnetic disk 6, the positions where the index signals are generated are rendered accurate. Desired compatibility among the recording and reproducing apparatus is thus ensured.

Although in the illustrated embodiment the recess 12c is defined in the outer peripheral surface of the turntable 12 and the locking finger 13c is placed in the recess 12c, a hole may be defined in the turntable 12 instead of the recess 12c and the locking finger 13c may engage in the hole.

With the arrangement of the present invention, the positioning pin is tilted only through a minimum angle smaller than a certain critical angle when the positioning pin is subjected to a force tending to resist the rotation of the magnetic disk. The magnetic disk is thus positioned accurately on the turntable, and hence the positions of the index signals recorded on the magnetic disk are accurately determined with respect to the turntable. The index signals are always generated at the same positions in different magnetic recording and reproducing apparatus, which are therefore rendered compatible with each other. The construction for ensuring the above positional accuracy is simple since the positioning pin is prevented from being unduly tilted by the locking finger bend in the leaf spring.

Although a certain preferred embodiment has been shown and described, it should be understood that many changes and modifications may be made therein without departing from the scope of the appended claims.

What is claimed is:

1. A disk support device for supporting a disk having a central hole and a support hole, comprising:
   (a) a rotatable drive shaft;
   (b) a turntable fixedly mounted on said rotatable drive shaft for supporting the disk on one surface thereof with a portion of said rotatable drive shaft inserted in the central hole in the disk, said turntable having a hole therethrough adapted to be located in registration with the support hole of the disk supported thereon;
   (c) a leaf spring having one end fixed to an opposite surface of said turntable and supporting a positioning pin remotely from said one end thereof, said positioning pin projecting upwardly under the resiliency of said leaf spring through said hole in said turntable for engagement in said support hole in the disk, and
   (d) means for preventing deformation of said leaf spring beyond a predetermined amount when said positioning pin is subjected to an engagement force by engagement in said support hole in the disk, said means including said turntable having an engaging portion, and said leaf spring having a locking finger held in engagement with said engaging portion of said turntable.

2. A disk support device for supporting a disk having a central hole and a support hole, comprising:
   (a) a rotatable drive shaft;
   (b) a turntable fixedly mounted on said rotatable drive shaft for supporting the disk on one surface thereof with a portion of said rotatable drive shaft inserted in the central hole in the disk, said turntable having a hole therethrough adapted to be located in registration with the support hole of the disk supported thereon;
   (c) a leaf spring having one end fixed to an opposite surface of said turntable and supporting a positioning pin remotely from said one end thereof, said positioning pin projecting upwardly under the resiliency of said leaf spring through said hole in said turntable for engagement in said second support hole in the disk, and
   (d) means for preventing deformation of said leaf spring beyond a predetermined amount when said positioning pin is subjected to an engagement force by engagement in said support hole in the disk, wherein said turntable has a recess defined in an outer peripheral surface thereof, and said leaf spring has a locking finger which is bent from an end of said leaf spring opposite to said one end and engaging in said recess.

* * * * *